(12) United States Patent
Buck

(10) Patent No.: US 12,141,865 B2
(45) Date of Patent: **\*Nov. 12, 2024**

(54) DYNAMIC MARKET ORDER EXECUTION VALIDATION MECHANISM

(71) Applicant: Trading Technologies International, Inc., Chicago, IL (US)

(72) Inventor: Brian J Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,567

(22) Filed: Dec. 30, 2022

(65) Prior Publication Data

US 2023/0137411 A1    May 4, 2023

Related U.S. Application Data

(63) Continuation of application No. 16/189,485, filed on Nov. 13, 2018, now Pat. No. 11,568,484, which is a continuation of application No. 13/937,785, filed on Jul. 9, 2013, now Pat. No. 10,169,815.

(51) Int. Cl.
    *G06Q 40/04* (2012.01)
(52) U.S. Cl.
    CPC .................... *G06Q 40/04* (2013.01)
(58) Field of Classification Search
    CPC ..................................... G06Q 40/04
    USPC ........................................... 705/37
    See application file for complete search history.

(56) References Cited

U.S. PATENT DOCUMENTS

| 2011/0078068 A1* | 3/2011 | Fishbain | G06Q 40/00 |
| | | | 705/37 |
| 2013/0204760 A1* | 8/2013 | Decker | G06Q 40/00 |
| | | | 705/37 |

FOREIGN PATENT DOCUMENTS

| AU | 2013205453 A1 * | 7/2014 | G06Q 40/04 |
| JP | 2009199485 A * | 9/2009 | |

OTHER PUBLICATIONS

Subramanian et al., "A Real-Time Protocol for Stock Market Transactions", Dept. of Computer & Information Science, Ohio State University, DOI: 10.1109/WECWIS.1999.788179. ISBN: 0-7695-0334-9. 9 pages. Jan. 1999 (Year: 1999).*

(Continued)

*Primary Examiner* — Ambreen A. Alladin
(74) *Attorney, Agent, or Firm* — MCDONNELL BOEHNEN HULBERT & BERGHOFF LLP

(57) ABSTRACT

A system, method, and non-transitory computer-readable information recording medium allows a user or trader to prepare, and send to an exchange, a trade order using a trading device. The trading device receives market data from an exchange and displays the received market data on a display unit of the trading device. The trading device also receives a trade order instruction via an input device at the trading device and detecting an occurrence of a market update as a function of the received market data within an established trade order time period associated with a time at which the trade order was received. If the occurrence of the market update was detected during the established trade order time period, the execution of the trade order is prevented.

20 Claims, 10 Drawing Sheets

(56) References Cited

OTHER PUBLICATIONS

Nuti et al., "Algorithmic Trading", UK Centre in Financial Computing, London. DOI: 10.1109/MC.2011.31. ISBN: 0018-9162 (paper); 1558-0814 (electronic). pp. 61-69. Nov. 2011 (Year: 2011).*

* cited by examiner

FIG. 5A

| SYCOM FGBL DEC99 10:48:44 | | BidQ | AskQ | Prc | LTQ |
|---|---|---|---|---|---|
| L | 3 | | 104 | 99 | |
| R | 5 | | 24 | 98 | |
| 720 | | | 33 | 97 | |
| X | 10 | | 115 | 96 | |
| | 0 | | 32 | 95 | |
| 10 | 1H | | 27 | 94 | |
| 50 | 3H | | 63 | 93 | |
| 1K | 5H | 49 | | 92 | 10 |
| CLR | | 125 | | 91 | |
| X | 10 | 97 | | 90 | |
| | 17 | 18 | | 89 | |
| CXL | ▪ | 97 | | 88 | |
| + | NET 0 | 30 | | 87 | |
| NET REAL | | 43 | | 86 | |
| | | 110 | | 85 | |
| | | 23 | | 84 | |
| | | 31 | | 83 | |
| | | 125 | | 82 | |
| | | 21 | | 81 | |

| EW | | | | | |
| S 10 / W 14 | | | | | |
| B 0 / W 15 | B 0 / W 13 | | | | |
| B 0 / W 17 | | | | | |

DYNAMIC MARKET ORDER EXECUTION VALIDATION MECHANISM

CROSS-REFERENCE TO RELATED APPLICATIONS

The present application is a continuation of U.S. patent application Ser. No. 16/189,485, filed Nov. 13, 2018, which is a continuation of U.S. patent application Ser. No. 13/937,785, filed Jul. 9, 2013, the contents of both of which are incorporated by reference herein for all purposes.

This patent document relates to U.S. patent application Ser. No. 11/417,915, filed May 3, 2006, (now U.S. Pat. No. 7,389,264, issued Jun. 17, 2008), U.S. patent application Ser. No. 10/137,979, filed May 3, 2002, (now U.S. Pat. No. 7,437,325, issued Oct. 14, 2008), U.S. patent application Ser. No. 09/589,751, filed Jun. 9, 2000, (now U.S. Pat. No. 6,938,011, issued Aug. 30, 2005), and U.S. patent application Ser. No. 09/590,692, filed Jun. 9, 2000 (now U.S. Pat. No. 6,772,132, issued Aug. 3, 2004), the disclosures of which are hereby incorporated by reference.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

The exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals or trading device. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

To profit in electronic markets, market participants must be able to assimilate large amounts of data in order to recognize market trends and to view current market conditions. Screen space is often an important factor for a trader to consider when he/she sets up a trading workstation, since the screen space directly affects the trader's ability to quickly view and process market data. Many traders use one large monitor running at a very high resolution in an effort to get the maximum amount of data onto the screen. However, in today's information-intensive markets, to be successful, traders often need to simultaneously view multiple trading interfaces, charts, industry news, spreadsheets, as well as other information. Since each application-created interface has at least one window, a single monitor does not allow a trader to simultaneously view data on multiple windows, and the time it takes the trader to flip between the windows does not make the single monitor the most optimal trading workspace solution.

The trading device typically includes tools which assist, and in some instances, automatically prepare at least part of a trade order prior to the trading finalizing and sending the trade order to the exchange. Once the trade order is prepared, the trading tools may allow the trader to finalize and send the trade order to the exchange through a single action, e.g., a click or actuation of a button (via a mouse or a touchscreen input device). However, during the acting of generating the trade order, e.g., movement of the mouse controlled cursor, the market data may have changed. Thus, it is possible that the trader does not have sufficient time in which to read and understand any impact the updated market data may have on the trade order.

The present invention is aimed at one or more of the problems identified above.

BRIEF DESCRIPTION OF THE FIGURES

Certain embodiments are disclosed with reference to the following drawings.

FIG. 5A illustrate a first instance of a display screen or window of a trading device for displaying market data and allowing a trader to generate a trade order, according to another embodiment of the present invention.

FIG. 5B illustrate a second instance of the display screen or window of a trading device of FIG. 5A.

FIG. 5C illustrate a third instance of the display screen or window of a trading device of FIG. 5A.

Figure 1:
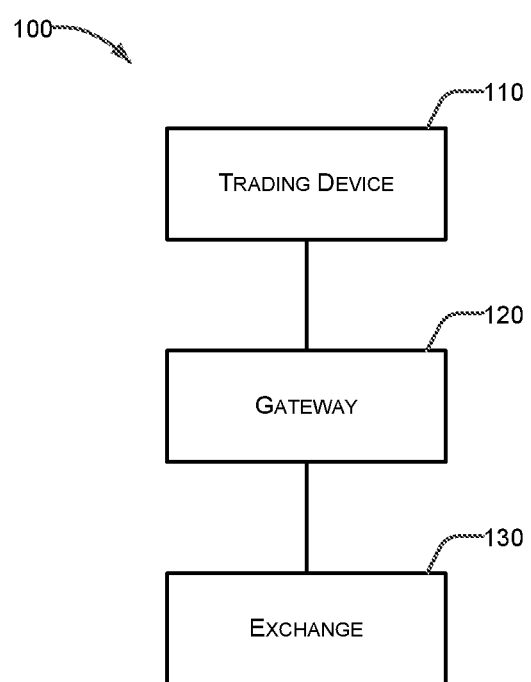
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The present invention relates generally to a computer system which is used to electronically perform trades on an exchange, and more particularly, to a system which determines if market data has been updated during the time a trader is finalizing a trade order and if an update occurs (1) seeks confirmation of the trade order, and/or (2) allows the trader to cancel the order, and/or (3) allows the trader to modify the order.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

In a first aspect of the present invention, a method includes the steps of receiving market data from an exchange at a trading device, displaying the received market data on a display unit of the trading device, and receiving a trade order instruction via an input device at the trading device. The method further includes the steps of detecting an occurrence of a market update as a function of the received market data within an established trade order time period associated with a time at which the trade order was received and preventing execution of the received order instruction if the occurrence of the market update was detected during the established trade order time period.

Further, if the execution of the received order instruction is prevented or otherwise delayed, the method may further allow a user of the trading device to (1) confirm the received trade order at the price level, (2) cancel the trade order, and/or (3) enter a new price level. In another embodiment, if the execution of the received order instruction is prevented or otherwise delayed, the method may suggest alternate price and/or available quantities that may satisfy one or more of the trade order requirements.

In a second aspect of the present invention, a trading device is provided. The trading device is coupled to an exchange and is configured to receive and display market data on a display unit. The trading device is configured to receive market data from an exchange at a trading device, to display the received market data on a display unit of the trading device, to receive a trade order instruction via an input device at the trading device, to detect an occurrence of a market update as a function of the received market data within an established trade order time period associated with a time at which the trade order was received, and to prevent execution of the received order instruction if the occurrence of the market update was detected during the established trade order time period.

In a third aspect of the present invention, a non-transitory computer-readable information recording medium which stores a program for controlling a computer to perform trade orders is provided. The program is configured to operate the computer as a trading device. The trading device is coupled to an exchange and is configured to receive and display market data on a display unit. The trading device is configured to receive market data from an exchange at a trading device, to display the received market data on a display unit of the trading device, to receive a trade order instruction via an input device at the trading device, to detect an occurrence of a market update as a function of the received market data within an established trade order time period associated with a time at which the trade order was received, and to prevent execution of the received order instruction if the occurrence of the market update was detected during the established trade order time period.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X TRADER®, an electronic trading platform provided by Trading Technologies International, Inc. of Chicago, Ill. ("Trading Technologies"). As another example, the trading device 110 may be a server running a trading application providing automated trading tools such as ADL™, AUTO SPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
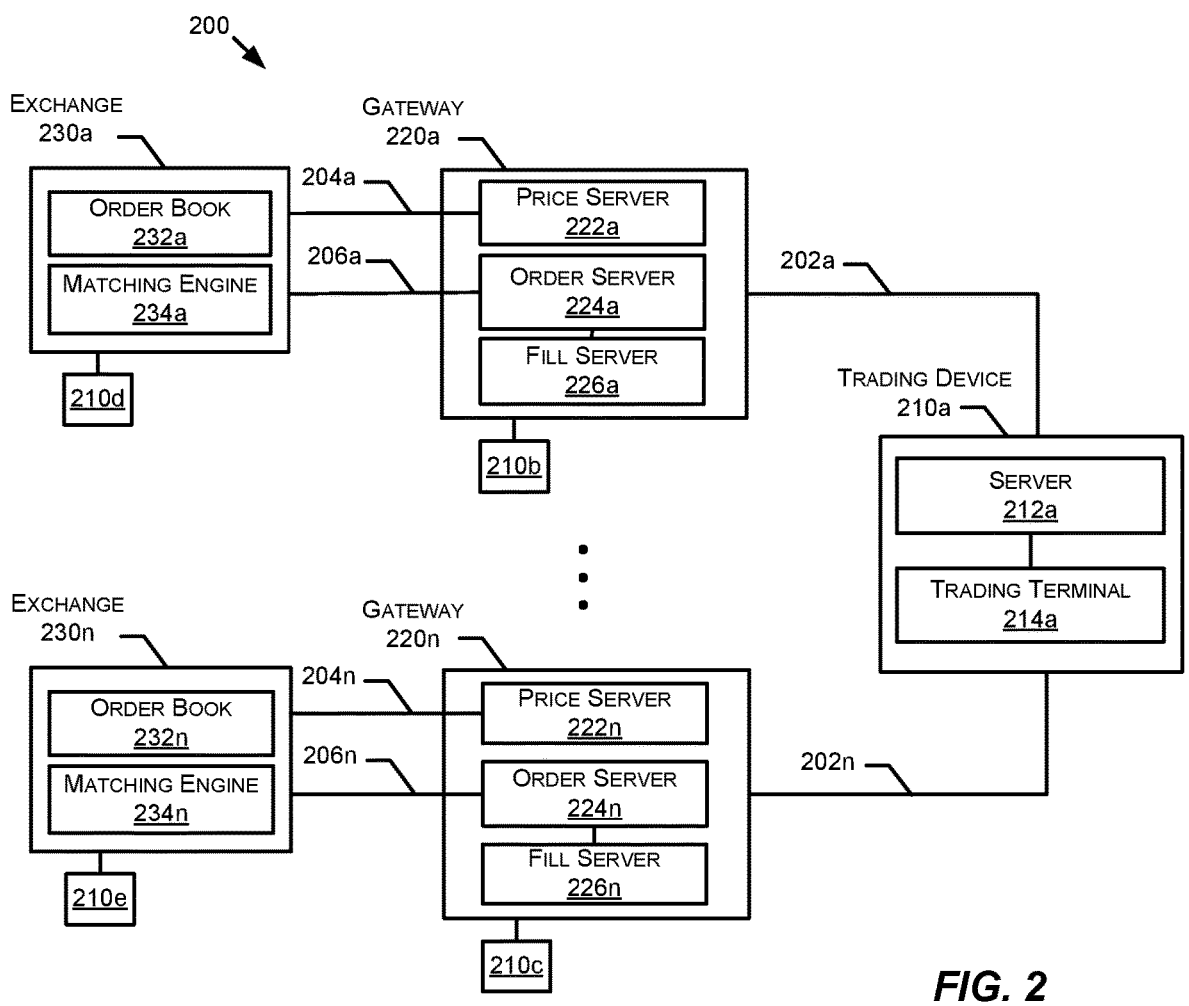
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines. Similarly, the gateway 220n, which may be similar to the gateway 220a, may include a price server 222n, order server 224n, and fill server 226n.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price. Similarly, the exchange 230n, which may be similar to the exchange 230a, may include an order book 232n and a matching engine 234n. The trading device 210a communicates with the gateway 220n across a multicast communication network 202n. The gateway 220n communicates with the exchange 230n via the network 204n and the network 206n.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3A:
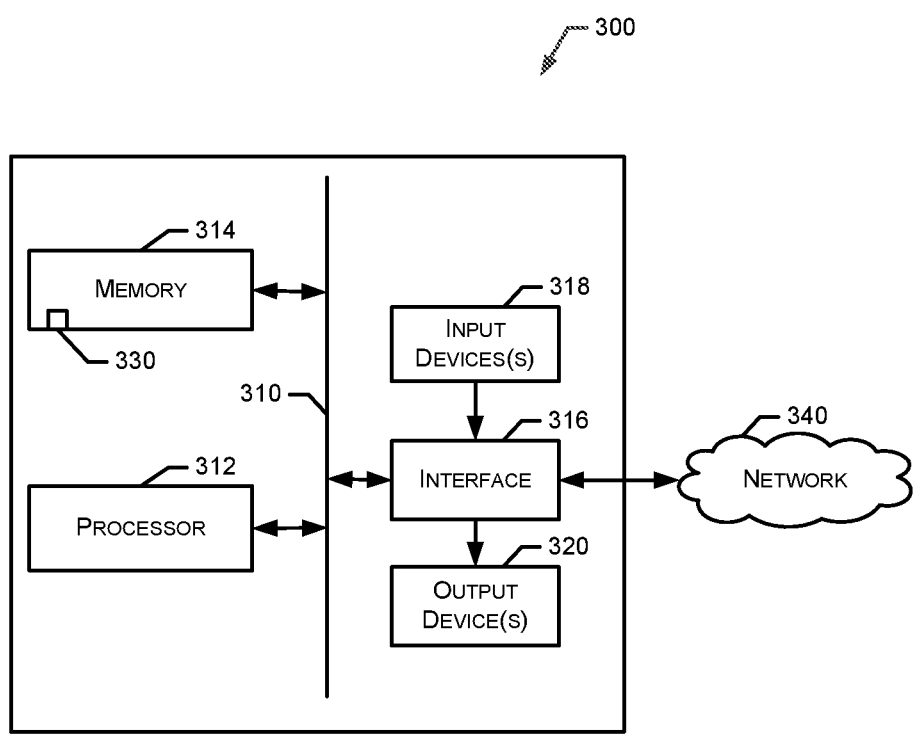
FIG. 3A illustrates a block diagram of an example computing device which may be used to implement the disclosed embodiments.

FIG. 3A illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3A, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

Figure 3B:
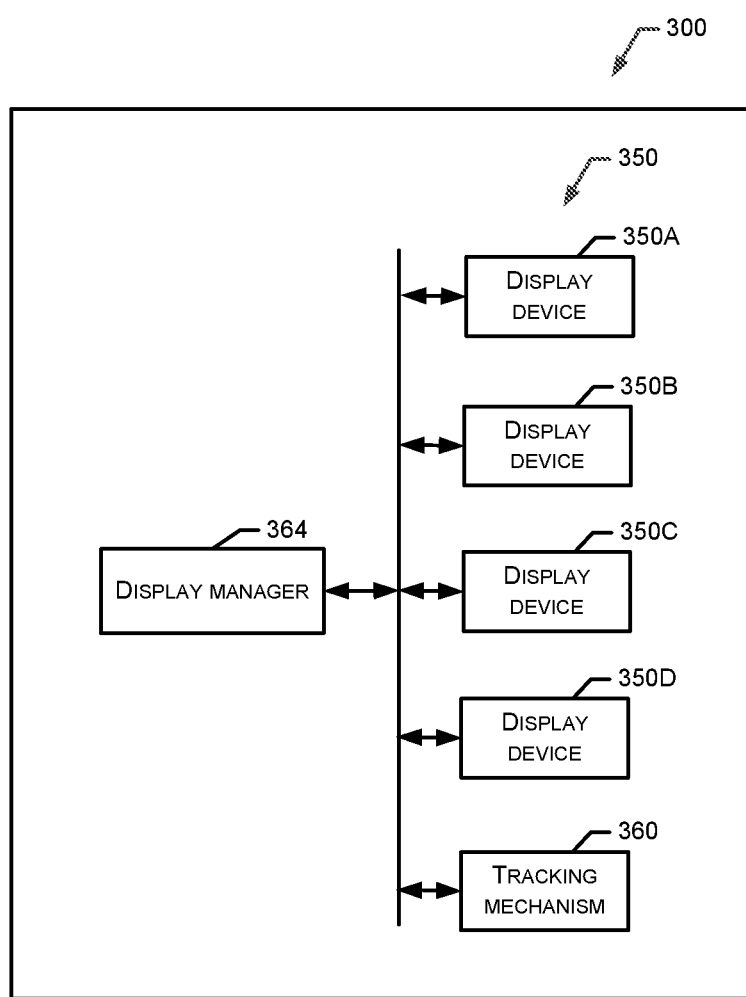
FIG. 3B illustrates a second block diagram of a computing or trading device according to an embodiment of the present invention.

With particular reference to FIG. 3B, the output device 320 of the trading device 300 may include a display unit 350 for displaying the market data received from the exchange 130. The market data as used herein may include additional information or data than the market data received directly from the exchange 130. For example, the market data may also include data generated by the trading device 300 (as a function of the market data received from the exchange 130 or otherwise), other information (received from other sources), and a user interface, which allows the trader to prepare and communicate trade orders to the exchange 130.

In one embodiment, the display unit 350 is a single display device. In another embodiment, the display unit 350 includes a plurality of device devices. In the illustrated embodiment, the display unit 350 includes first, second, third and fourth display devices 350A, 350B, 350C, 350D, and a tracking mechanism 360, although the present invention is not limited to any number of display devices. In one aspect of the present invention, the display devices 350A, 350B, 350C, 350D are treated as a single large display, where elements (such as windows) displayed thereon are freely moveable across the separate display devices. In other aspect of the present invention, the display devices 350A, 350B, 350C, 350D are treated as a single large display, however, the position of elements or blocks of information are predetermined and generally fixed (although the position may be configurable).

A display manager 364 controls display of information on the display unit 350 and/or display devices 350A, 350B, 350C, 350D.

V. Strategy Trading

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may AUTOSPREADER®, provided by Trading Technologies.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
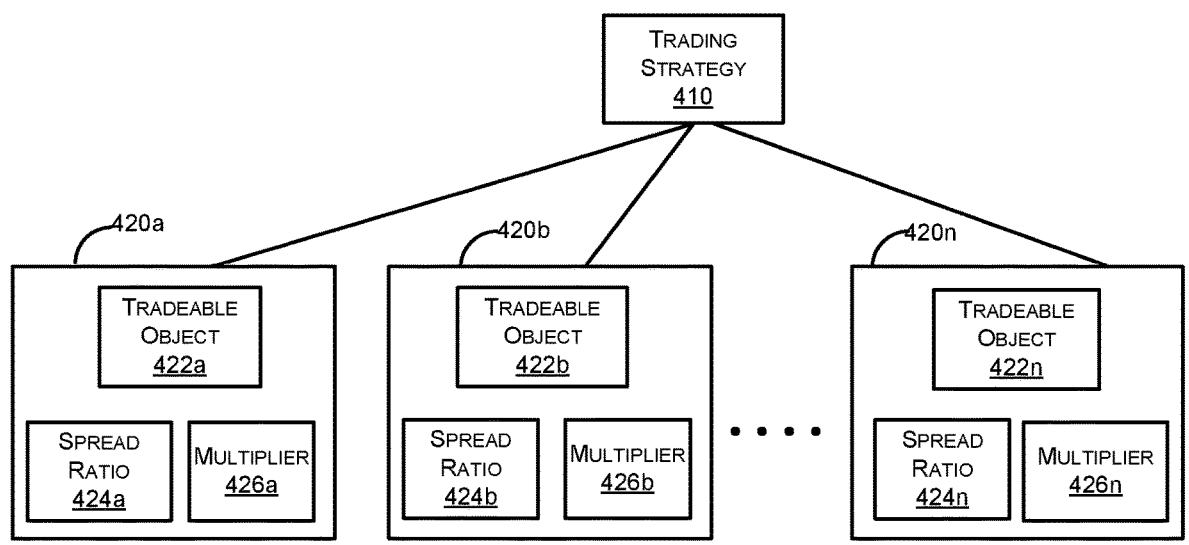
FIG. 4 illustrates a block diagram of a trading strategy which may be employed with certain disclosed embodiments.

FIG. 4 illustrates a block diagram of a trading strategy 410 which may be employed with certain disclosed embodiments. The trading strategy 410 includes "n" legs 420 (individually identified as leg 420a to leg 420n). The trading strategy 410 defines the relationship between tradeable objects 422 (individually identified as tradeable object 422a to tradeable object 422n) of each of the legs 420a to 420n using the corresponding spread ratios 424a to 424n and multipliers 426a to 426n.

Once defined, the tradeable objects 422 in the trading strategy 410 may then be traded together according to the defined relationship. For example, assume that the trading strategy 410 is a spread with two legs, leg 420a and leg 420b. Leg 420a is for tradeable object 422a and leg 420b is for tradeable object 422b. In addition, assume that the spread ratio 424a and multiplier 426a associated with leg 420a are "1" and that the spread ratio 424b and multiplier 426b associated with leg 420b are "−1". That is, the spread is defined such that when the spread is bought, 1 unit of tradeable object 422a is bought (positive spread ratio, same direction as the spread) and 1 unit of tradeable object 422b is sold (negative spread ratio, opposite direction of the spread). As mentioned above, typically in spread trading the opposite of the definition applies. That is, when the definition for the spread is such that when the spread is sold, 1 unit of tradeable object 422a is sold (positive spread ratio, same direction as the spread) and 1 unit of tradeable object 422b is bought (negative spread ratio, opposite direction of the spread).

The price for the trading strategy 410 is determined based on the definition. In particular, the price for the trading strategy 410 is typically the sum of price the legs 420 comprising the tradeable objects 422 multiplied by corresponding multipliers 426. The price for a trading strategy may be affected by price tick rounding and/or pay-up ticks. However, both of these implementation details are beyond the scope of this discussion and are well-known in the art.

Recall that, as discussed above, a real spread may be listed at an exchange, such as exchange 130 and/or 230, as a tradeable product. In contrast, a synthetic spread may not be listed as a product at an exchange, but rather the various legs of the spread are tradeable at one or more exchanges. For the purposes of the following example, the trading strategy 410 described is a synthetic trading strategy. However, similar techniques to those described below may also be applied by an exchange when a real trading strategy is traded.

Continuing the example from above, if it is expected or believed that tradeable object 422a typically has a price 10 greater than tradeable object 422b, then it may be advantageous to buy the spread whenever the difference in price between tradeable objects 422a and 422b is less than 10 and sell the spread whenever the difference is greater than 10. As an example, assume that tradeable object 422a is at a price of 45 and tradeable object 422b is at a price of 40. The current spread price may then be determined to be (1)(45)+(−1)(40)=5, which is less than the typical spread of 10. Thus, a user may buy 1 unit of the spread, which results in buying 1 unit of tradeable object 422a at a price of 45 and selling 1 unit of tradeable object 422b at 40. At some later time, the typical price difference may be restored and the price of tradeable object 422a is 42 and the price of tradeable object 422b is 32. At this point, the price of the spread is now 10. If the user sells 1 unit of the spread to close out the user's position (that is, sells 1 unit of tradeable object 422a and buys 1 unit of tradeable object 422b), the user has made a profit on the total transaction. In particular, while the user bought tradeable object 422a at a price of 45 and sold at 42, losing 3, the user sold tradeable object 422b at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradeable objects 422 of the trading strategy 410 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

VI. Trade Order Generation at a Trading Device

In one aspect of the present invention, the user or trader is presented with a screen, window, or dialog which presents market information related to a single tradeable object or contract. As described below, the market information may include both inside market information and market depth information. The screen, window, or dialog allows a user to view the information and to generate a trade order which may then be sent to the exchange where it is filled if the conditions of the trade order are met. After the trade order has been sent to the exchange for execution, the screen, window, or dialog may allow the trader to cancel or modify the order (before the order has been filled). A trade order may be an order to buy or sell a given number of a single tradeable object or may contain multiple single orders of an object which has one or more contingencies attached (see above). Several examples of screen displays are described below for displaying market data and for generating the trade order. However, it should be noted that these examples are for discussion purposes only. The present invention is not limited to particular screen, window or dialog for displaying the market data or for generating the trade order.

Figure 5A:
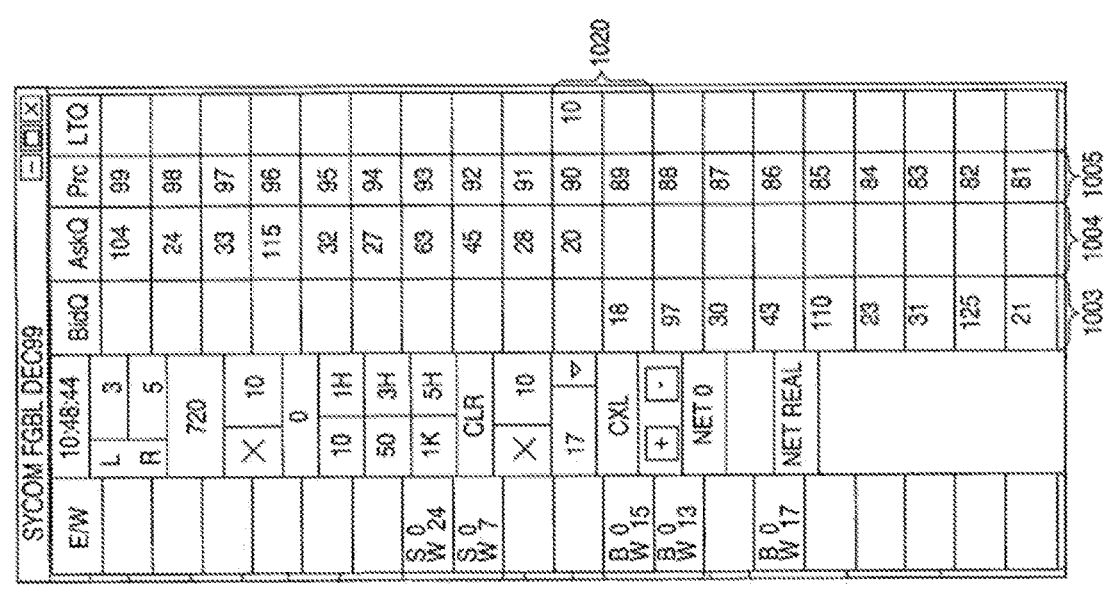
Figure 5C:
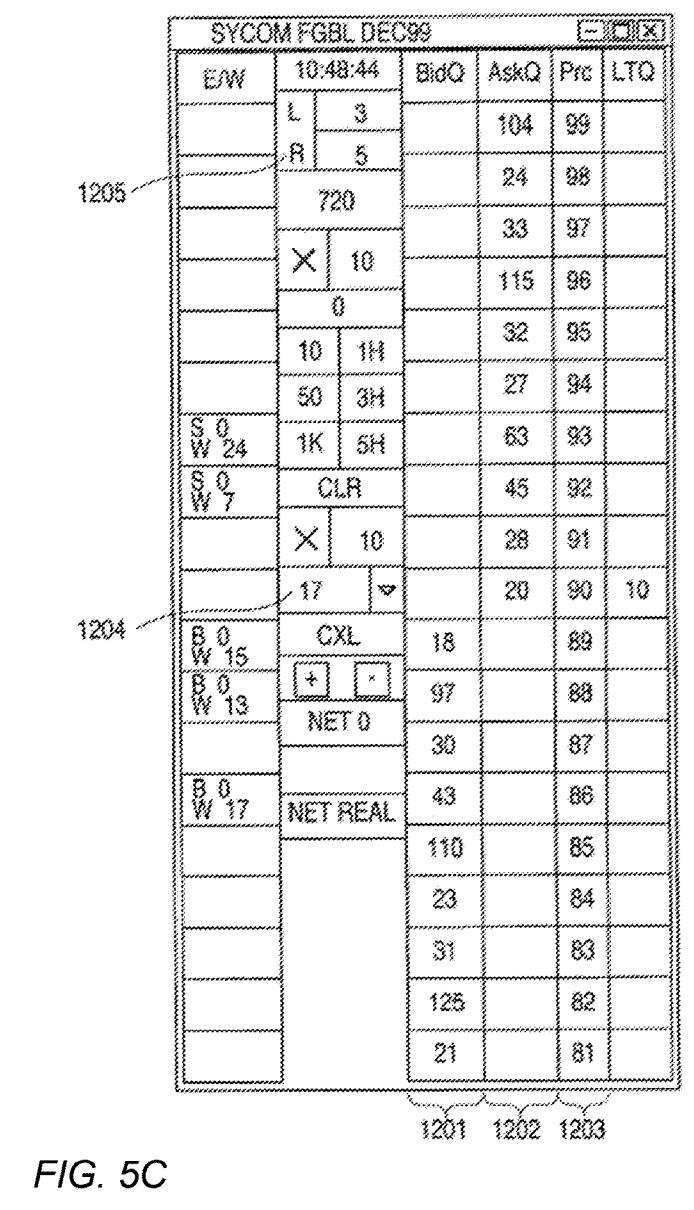

FIGS. 5A to 5C illustrate example trading displays disclosed and described in commonly owned U.S. Pat. No. 6,772,132 entitled "Click Based Trading with Intuitive Grid Display of Market Depth," the contents of which are incorporated herein by reference.

In particular, FIGS. 5A-5C illustrate embodiments of a trading display screen which displays market data and allows the trader to generate a trade order.

The display of market depth and the manner in which traders trade within the market depth can be effected in different manners, which many traders will find materially better, faster and more accurate. In addition, some traders may find the display of market depth to be difficult to follow. In the trading display shown in FIG. 5A, the market depth is displayed vertically so that both Bid and Ask quantities are aligned adjacent to a common value axis. A vertical field is shown in the figures and described for convenience, but the field could be horizontal or at an angle.

Bid quantities are displayed in the bid column 1003 (labeled BidQ), and ask quantities are displayed in a corresponding ask column 1004 (labeled AskQ). The bid and ask columns 1003 and 1004 are aligned adjacent to a value axis 1005. In the illustrated example, the value axis 1005 includes multiple value levels representative of the prices for a given commodity. The prices at each individual value level are divided into ticks representing the minimum price movement or increment for the given commodity. The example value column 1005 does not list the whole prices (e.g. 95.89), but rather, just the last two digits (e.g. 89). In the example shown, the inside market, cells 1020, is 18 (best bid quantity) at 89 (best bid price) and 20 (best ask quantity) at 90 (best ask price). In the preferred embodiment of the invention, these three columns are shown in different colors so that the trader can quickly distinguish between them.

The values and prices displayed in the value column 1005 are considered to be static in that the quantities displayed in the bid and ask columns 1003 and 1004 move and change quickly relative to any movement or change affecting the position or location of the individual levels making up the value column 1005. In certain embodiments, the values and prices displayed in the value column 1005 may change positions in response to a re-centering command, or other event triggering event such as the movement of the quantities displayed in the bid and ask columns 1003 and 1004 relative to a range of value levels, or the passage of time from a previous triggering event or any other detectable or measurable event.

The inside market and market depth ascend and descend as prices in the market increase and decrease. For example, FIG. 5B shows a screen displaying the same market as that of FIG. 5A but at a later interval where the inside market, cells 1101, has risen three ticks. Here, the inside market for the commodity is 43 (best bid quantity) at 92 (best bid price) and 63 (best ask quantity) at 93 (best ask price). In comparing FIGS. 5A and 5B, it can be seen that the value column 1005 remained static, but the corresponding bids and asks rose up the price column. Market Depth similarly ascends and descends the value column 1005, leaving a vertical history of the market. In operation, a trader can trade with single clicks of the right or left mouse button. For example, orders may be entered by right clicking and left clicking on the BidQ field or the AskQ field.

Using the screen display and values from FIG. 5C, the placement of trade orders using the illustrated trading display and trading method is now described using examples. Selection via a left mouse button click on the 18 in the BidQ column 1201 sends an order to market to sell 17 lots (quantity # chosen on the Quantity Description pull down menu cell 1204) of the commodity at a price of 89 (the corresponding price in the Prc column 1203). Similarly, selection via a left mouse button click on the 20 in the AskQ column 1202 sends an order to market to buy 17 lots at a price of 90.

Selection using a right mouse button click, sends an order to market at a price that corresponds to the row selected or clicked for the total quantity of orders in the market that equal or better the price in that row plus the quantity in the R field 1205. Thus, a right mouse button click in the AskQ column 1202 in the 87 price row sends a sell order to market at a price of 87 and a quantity of 150. 150 is the sum of all the quantities 30, 97, 18 and 5. 30, 97 and 18 are all of the quantities in the market that would meet or better the trader's sell order price of 87. These quantities are displayed in the BidQ column 1201 because this column represents the orders outstanding in the market to purchase the commodity at each corresponding price.

Similarly, a right click in the BidQ column 1201 at the same price level of 87 sends a buy limit order to market for a quantity of 5 at a price of 87. The quantity is determined in the same manner as above. In this example, though, there are no orders in the market that equal or better the chosen price—there are no quantities in the AskQ column 1202 that equal or better this price. Therefore, the sum of the equal or better quantities is zero ("0"). The total order entered by the trader will be the value in the R field, which is 5.

VII. Dynamic Market Order Execution Validation Mechanism

With particular reference to the drawings, and in operation, the present disclosure provides an apparatus or trading device 110, a method 600, and a non-transitory computer-readable information recording medium for allowing a trader to view market data received from the exchange 130 on the display unit 350 of the trading device 110.

Figure 6:
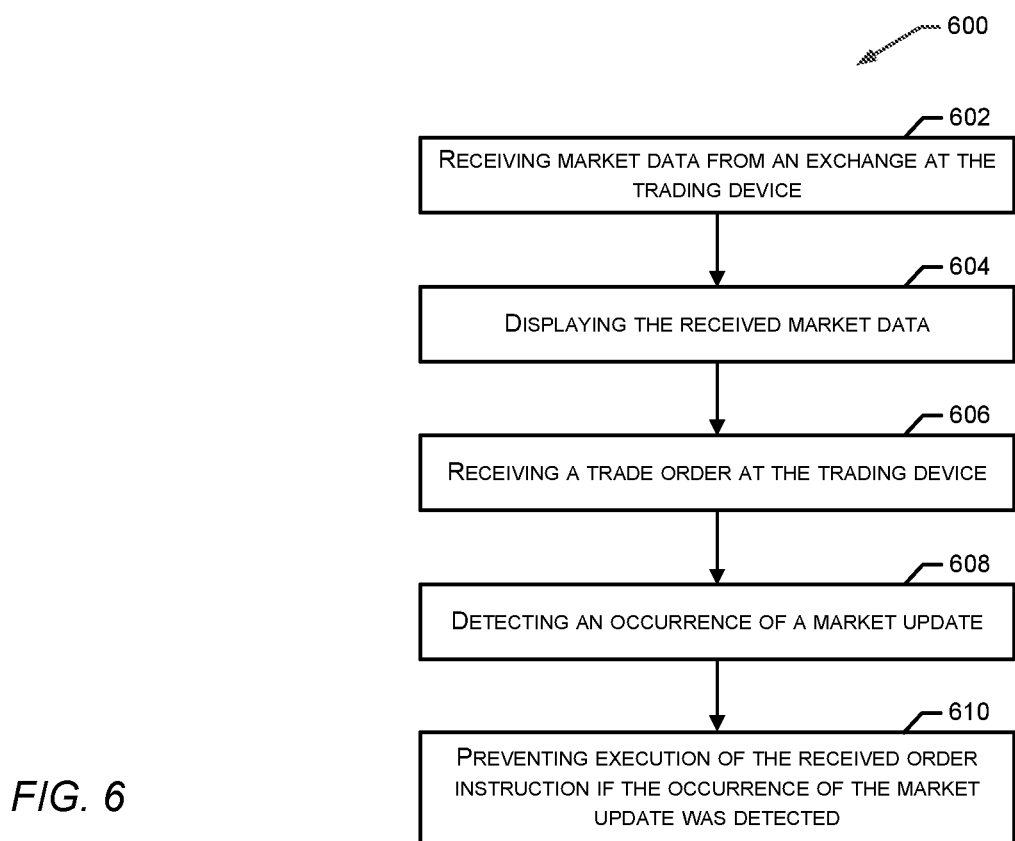
FIG. 6 is a flow diagram of a method associated with a trading device, according to an embodiment of the present invention.

With particular reference to FIG. 6, in one embodiment, the method includes the steps of receiving market data from an exchange 130 at a trading device 110 (step 602) and displaying the received market data on a display unit 350 of the trading device (step 604). In step 606, a trade order instruction is received via an input device 318 at the trading device 110. In step 608, an occurrence of a market update is detected as a function of the received market data within an established trade order time period associated with a time at which the trade order was received. Execution of the received order instruction is prevented if the occurrence of the market update was detected during the established trade order time period (step 610).

As described above, the trader may utilize the displayed market data to formulate a trade order using an input screen, window or dialog. The trader may use an input device 318 at the trading device 110 in formulating the trade order. Once the trade order has been formulated or put together and the trader has decided to submit the trade order to the exchange so that it may be executed by submitting the trade order to the exchange 130.

The input device 318 may be, or include one or more of the following: a computer mouse, a trackpad, a keyboard, a touchscreen device (a touchscreen input device associated with the display unit 350), a non-contact order detection system or similar device. Depending on the input device 318 being used, the trader actuates the input device 318, generally with respect to a predetermined portion of the input screen, window, or dialog, to submit the trade order to the exchange 130.

While the trader is actuating the input device, the market data may have changed. The change or update in the market data may impact the trade order. In other words, if the trader was made aware of the update in the market data, the trader would have decided to not proceed with the trade order or to modify the trade order.

For example, as described above, the trader may submit a trade order using a 1-click process which involves moving a cursor (not shown) on the display unit 350 using a computer mouse to a specified position on display, such as a virtual button. Once the cursor has reached the specified position, the trader submits the trade order through clicking a mouse button. However, during the time the trader is moving the cursor and actuating the mouse button, the market data may have changed. In one embodiment the updated market data may have been received at the trading device 110, but not displayed. In another embodiment, the updated market data has been received at the trading device 110 and has been displayed on the display unit 350.

It should be noted that the operation of the trading device 110, i.e., what occurs at the trading device 110, during the time period leading up to actuation of the input device 110 to submit the trade order is dependent upon the input device 318. For instance, if a touchscreen device is used as the input device, a cursor may not be displayed on the display unit 350. Therefore, actuation of the input device 318 and submission of the trade order may be based solely on actuation (or a touch) of the specified position on the display unit 350.

In one aspect of the present disclosure, the trading device 110 is configured to detect an occurrence of a market update as a function of the received market data within an established trade order time period associated with a time at which the trade order was received. In other words, a trade order time period may be established which relates to the time at which the trader actuates the input device 318. In one embodiment, the trade order time period of, for example, 100, 250 or 500 milliseconds can be used to prevent entrance of an order upon detection of a change in the market data. A wide range of trade order time periods may be established based on a trader's strategies, habits and preferences. In one embodiment, the trade order time period has a start time at some time prior to actual actuation of the input device 318 and has an end time. The period of time between the start time and the end time may be predetermined or configurable. Furthermore, the end time of the trade order time period may be before the actual actuation time, equal to the actual actuation time, or after the actual actuation time.

If the market update is detected during the trade order time period, than the trading device 110 prevents execution of the received order instruction. For instance in one embodiment, the trading device 110 does not transmit the trade order to the exchange in response to the detection of the market update during the trade order time period.

In one embodiment, if the input device 318 is a computer mouse and the trader utilizes the computer mouse to control a cursor on the display unit 350, the trading device 110 detects if the cursor is moving during the trade order time period. The market update is detected if the cursor is moving and the market data has changed during the trade order time period.

In another aspect of the present disclosure, if the trading device 110 prevents execution of the trade order, as described, the trading device 110 may be configured to correct the problem or cancel the order. For example, in one embodiment the trading device 110 may be configured to automatically cancel the trade order of the market update is detected. The trading device 110 may provide a notice to the trader in response to the automatic cancellation. The notice may take one or more of any form, including but not limited to a text message, e.g., in a dialog, audio, and visual. For example, the icon representing the cursor may be temporally changed in the event the trade is canceled.

Figures 7A, 7B, 7C:
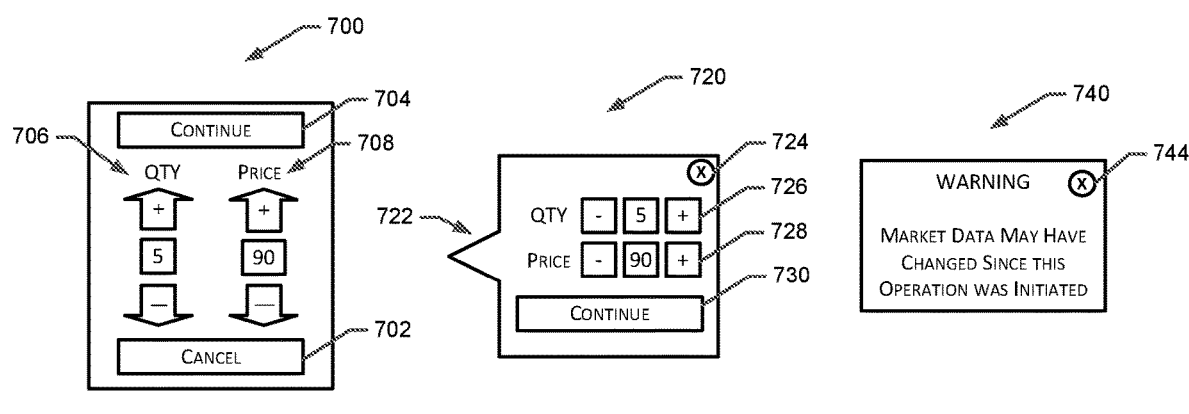
FIGS. 7A, 7B and 7C illustrate embodiments of a notification window that may be presented in conjunction with the display screen or window of a trading device of FIGS. 5A to 5C.

In another embodiment of the present disclosure, the trader may be notified of the cancellation or prevention of trade order and provided an opportunity to confirm (or override the prevention) of the trade order at the original price level. FIG. 7A illustrates an example of a notification pop-up or dialog box 700 that may be presented to a trader when a trader order in the event that a change in market data has been detected. The example dialog box 700 provider user controls to cancel the trade order (element 702) and continue the order process (element 704). The example dialog box 700 further includes controls to adjust (e.g., increase and decrease) the quantity (QTY element 706) and the price (PRICE element 708) associated with the trader order. FIG. 7B illustrates another example of a notification pop-up or dialog box 720 that may be presented adjacent to the price level 90 shown in FIG. 5A. For example, the dialog box 720 may appear after an order has been entered via the trading display screens shown in FIGS. 5A to 5C. The example dialog-box 720 may further include a pointer or price indicator portion 722 that may align with or otherwise indicate the price level at which the trade order was placed. The dialog box 720 further includes interface controls to: cancel the trade order and close the dialog box (element 724); adjust the quantity associated with the trade order (QTY element 726); adjust the price associated with the trade order (PRICE element 728) and continue the order with the original or new order parameters (element 730). FIG. 7C illustrates an example of a notification dialog 740 that may be presented to a user when a change in market data has been detected. The notification dialog 740 may further include a close or cancel element 744. In another embodiment, the notification dialog 740 may be closed automatically after a predetermined period (e.g., 1 second, or 0.5 second).

Once a trade order has been sent to the exchange 130, the trade order may remain there until (1) its pre-conditions are met and the order is filled, or (2) the trader cancels or modifies the trade order. In one embodiment of the present invention, the trading device 110 may be configured to, once a trade order has been sent to the exchange 130, receive a cancel/modify trade instruction relative to the sent trade order.

The same issue may arise with respect to the cancel/modify trade order instruction and market update. Thus, the trading device 110 may be configured to detect market updates when a cancel/modify trade order instruction is received. In particular, the trading device 110 may be configured to detect an occurrence of a market update as a function of the received market data within an established cancel/modify time period associated with a time at which the cancel/modify trade instruction was received. If a market update was received during the trade order time period, the trading device 110 may be configured to prevent execution of the received cancel/modify trade instruction.

The trade order time may be defined in a manner similar to the trade order time period as described above.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A non-transitory computer readable medium having stored therein instructions of a trading application, which when executed by a processor of a trading device cause the processor of the trading device to carry out acts comprising:

providing, on a display of the trading device by the processor of the trading device controlling the display of the trading device, a trading screen of a graphical user interface of the trading application;

receiving, via the trading screen by the processor of the trading device receiving input from an input device of the trading device, a user order entry action for a trade order that specifies a tradeable object and a price for the tradeable object of the trade order;

initiating by the processor of the trading device, in response to receiving the user order entry action, a trade order validation time period having a start time and an end time, wherein the start time corresponds to the time when the user order entry action is received;

preparing by the processor of the trading device, in response to receiving the user order entry action, an order message for the trade order to be sent to a server of an electronic exchange at the end time;

receiving by the processor of the trading device market data that is generated at the server of the electronic exchange and that includes data related to the tradeable object;

determining by the processor of the trading device whether the received market data includes a market data update related to the tradeable object and whether the received market data was received prior to the end time of the trade order validation time period;

in response to determining that the market data update is received during the trade order validation time period, delaying by the processor of the trading device the trade order from being sent from the trading device to the server of the electronic exchange at the end time and displaying by the trading device a notification dialog interface in the graphical user interface of the trading application including an interactive element to release the trade order;

receiving, via the notification dialog interface, a second user order entry action to release the delayed trade order; and in response to receiving the second user order entry action to release the delayed trade order, sending by the processor of the trading device the order message to the server of the electronic exchange.

2. The non-transitory computer readable medium of claim 1, wherein the end time of the trade order validation time period is after the user order entry action is received at the trading screen.

3. The non-transitory computer readable medium of claim 1, wherein the notification dialog interface displayed in the trading screen includes a trade order warning as part of the interactive element.

4. The non-transitory computer readable medium of claim 3, wherein the interactive element includes a confirmation selection icon for the trade order, and wherein sending the order message to the electronic exchange in response to receiving the second user order entry action to release the delayed trade order comprises sending, by the trading device, the order message without modification to the electronic exchange in response to the second user order entry representing a selection of the confirmation selection icon.

5. The non-transitory computer readable medium of claim 3, wherein the interactive element further includes an order cancellation icon for the trade order, and wherein the acts further comprise, in response to receiving, via the trading screen, a user order entry representing a selection of the order cancellation icon, the trading device cancelling the trade order at the electronic exchange.

6. The non-transitory computer readable medium of claim 3, wherein the interactive element further includes an order modification icon for the trade order, wherein the trading device sending the order message to the electronic exchange in response to receiving the second user order entry action comprises:
modifying, by the trading device in response to the second user order entry representing a selection of the order modification icon, at least one trade order parameter for the order message; and
sending the modified order message to the electronic exchange.

7. The non-transitory computer readable medium of claim 6, wherein the order modification icon includes at least one of a price modification field and an order quantity modification field.

8. The non-transitory computer readable medium of claim 1, wherein the trade order specifies a buy or sell order including a first order quantity of the tradeable object offered at the electronic exchange.

9. The non-transitory computer readable medium of claim 1, wherein the trade order is a cancellation order specifying an order pending at the electronic exchange, wherein the order includes a first order quantity at a price for the tradeable object.

10. The non-transitory computer readable medium of claim 1, wherein the trade order is a modification order specifying an order pending at the electronic exchange, wherein the order includes a first order quantity at a price for the tradeable object.

11. A system comprising:
a user interface of a user trading device;
a processor of the user trading device; and
a memory of the user trading device having stored therein computer-readable instructions of a trading application that are executed by the processor to carry out acts comprising:
providing, on the user interface by the processor of the user trading device controlling a display of the user interface of the user trading device, a trading screen of a graphical user interface of the trading application;
receiving, via the trading screen by the processor of the user trading device receiving input from an input device of the user interface of the user trading device, a user order entry action for a trade order that specifies a tradeable object and a price for the tradeable object of the trade order;
initiating, by the processor of the user trading device in response to receiving the user order entry action, a trade order validation time period having a start time and an end time, wherein the start time corresponds to the time when the user order entry action is received;
preparing by the processor of the user trading device, in response to receiving the user order entry action, an order message for the trade order to be sent to a server of an electronic exchange at the end time;
receiving by the processor of the user trading device, from the server of the electronic exchange, market data that is generated at the server of the electronic exchange and that includes data related to the tradeable object;
determining by the processor of the user trading device whether the received market data includes a market data update related to the tradeable object and whether the received market data was received prior to the end time of the trade order validation time period;
in response to determining that the market data update is received during the trade order validation time period, delaying by the processor of the user trading device the trade order from being sent to the server of the electronic exchange at the end time and displaying, by the user trading device in the graphical user interface of the trading application, a notification dialog interface including an interactive element to release the trade order;
receiving, via the notification dialog interface, a second user order entry action to release the delayed trade order; and
in response to receiving the second user order entry action to release the delayed trade order, sending, from the processor of the user trading device to the server of the electronic exchange, the order message.

12. The system of claim 11, wherein the end time of the trade order validation time period is after the user order entry action is received via the trading screen.

13. The system of claim 11, wherein the notification dialog interface displayed via the trading screen includes a trade order warning as part of the interactive element.

14. The system of claim 13, wherein the interactive element includes a confirmation selection icon for the trade order, and wherein sending the order message to the electronic exchange in response to receiving the second user order entry action to release the delayed trade order comprises sending the order message without modification to the electronic exchange in response to the second user order entry representing a selection of the confirmation selection icon.

15. The system of claim 13, wherein the interactive element further includes an order cancellation icon for the trade order, and wherein the acts further comprise, in response to receiving, via the trading screen, a user order entry representing a selection of the order cancellation icon, the processor cancelling the trade order at the electronic exchange.

16. The system of claim 13, wherein the interactive element further includes an order modification icon for the trade order, wherein the processor sending the order message to the electronic exchange in response to receiving the second user order entry action comprises:
modifying, by the processor in response to the second user order entry representing a selection of the order modification icon, at least one trade order parameter for the order message; and
sending the modified order message to the electronic exchange.

17. The system of claim 16, wherein the order modification icon includes at least one of a price modification field and an order quantity modification field.

18. The system of claim 11, wherein the trade order specifies a buy or sell order including a first order quantity of the tradeable object offered at the electronic exchange.

19. The system of claim 11, wherein the trade order is a cancellation order specifying an order pending at the electronic exchange, wherein the order includes a first order quantity at a price for the tradeable object.

20. The system of claim 11, wherein the trade order is a modification order specifying an order pending at the electronic exchange, wherein the order includes a first order quantity at a price for the tradeable object.

* * * * *